United States Patent
Zhu et al.

(10) Patent No.: US 12,198,226 B2
(45) Date of Patent: Jan. 14, 2025

(54) COMPUTER-IMPLEMENTED METHOD, APPARATUS, AND COMPUTER-PROGRAM PRODUCT

(71) Applicant: BOE Technology Group Co., Ltd., Beijing (CN)

(72) Inventors: Dan Zhu, Beijing (CN); Guannan Chen, Beijing (CN); Hanwen Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/907,012

(22) PCT Filed: Dec. 28, 2021

(86) PCT No.: PCT/CN2021/141884
§ 371 (c)(1),
(2) Date: Sep. 22, 2022

(87) PCT Pub. No.: WO2023/122927
PCT Pub. Date: Jul. 6, 2023

(65) Prior Publication Data
US 2024/0202983 A1    Jun. 20, 2024

(51) Int. Cl.
*G06T 11/00* (2006.01)
*G06T 5/20* (2006.01)
(Continued)

(52) U.S. Cl.
CPC .............. *G06T 11/00* (2013.01); *G06T 5/20* (2013.01); *G06T 7/73* (2017.01); *G06V 10/751* (2022.01);
(Continued)

(58) Field of Classification Search
CPC .............. G09G 5/377; G09G 2340/10; G09G 2340/04; G09G 2340/0407; G09G 5/391;
(Continued)

(56) References Cited

U.S. PATENT DOCUMENTS

| 2016/0055627 A1* | 2/2016 | Shibata | G06F 18/28 |
| | | | 382/254 |
| 2019/0205694 A1* | 7/2019 | Wang | G06V 40/165 |

(Continued)

FOREIGN PATENT DOCUMENTS

| CN | 102298775 B | 4/2013 |
| CN | 110223231 A | 9/2019 |

(Continued)

OTHER PUBLICATIONS

International Search Report & Written Opinion mailed Jul. 27, 2022, regarding PCT/CN2021/141884.

(Continued)

*Primary Examiner* — Hau H Nguyen
(74) *Attorney, Agent, or Firm* — Intellectual Valley Law, P.C.

(57) ABSTRACT

A computer-implemented method is provided. The computer-implemented method includes inputting a low-resolution image and a plurality of high-resolution images into a feature extractor, the low-resolution image and the plurality of high-resolution images including images of a target object; obtaining, by the feature extractor, feature maps of the low-resolution image and the plurality of high-resolution images; comparing similarities between the feature maps of the low-resolution image and the plurality of high-resolution images; obtaining selected feature maps of one or more selected high-resolution images of the plurality of high-resolution images most similar to the low-resolution image; inputting the selected feature maps into a generator to output (Continued)

a repair image; enhancing the low-resolution image using a pre-processing image enhancing process to generate an enhanced image; and morphing the repair image with the enhanced image.

18 Claims, 8 Drawing Sheets

(51) Int. Cl.
    *G06T 7/73*     (2017.01)
    *G06V 10/75*     (2022.01)
    *G06V 10/77*     (2022.01)
    *G06V 10/776*     (2022.01)
    *G06V 10/82*     (2022.01)

(52) U.S. Cl.
    CPC ........ *G06V 10/7715* (2022.01); *G06V 10/776* (2022.01); *G06V 10/82* (2022.01); *G06T 2207/10016* (2013.01); *G06T 2207/20084* (2013.01); *G06T 2207/30201* (2013.01); *G06T 2210/44* (2013.01)

(58) Field of Classification Search
    CPC . G06T 2207/20081; G06T 2207/20084; G06T 3/4046; G06T 3/4076; G06T 3/4061; G06T 3/4053; G06T 2207/20208; G06T 2207/10016; G06T 2207/20172; G06T 2207/30201; G06T 7/73; G06T 11/00
See application file for complete search history.

(56) References Cited

U.S. PATENT DOCUMENTS

2021/0065337 A1    3/2021  Bai
2021/0342984 A1*  11/2021  Lin ........................ G06T 5/50

FOREIGN PATENT DOCUMENTS

| | | |
|---|---|---|
| CN | 110287835 A | 9/2019 |
| CN | 111062904 A | 4/2020 |
| CN | 111768354 A | 10/2020 |
| CN | 111860115 A | 10/2020 |
| CN | 113066034 A | 7/2021 |
| CN | 113139907 A | 7/2021 |
| WO | 2019228317 A1 | 12/2019 |
| WO | 2020010659 A1 | 1/2020 |

OTHER PUBLICATIONS

Chen et al., "Face Image Inpainting Using Casaded Generative Adversarial Networks", Journal of University of Electronics Science and Technology of China, vol. 48, No. 6, Nov. 2019, pp. 112-119.

* cited by examiner

COMPUTER-IMPLEMENTED METHOD, APPARATUS, AND COMPUTER-PROGRAM PRODUCT

CROSS-REFERENCE TO RELATED APPLICATION

This application is a national stage application under 35 U.S.C. § 371 of International Application No. PCT/CN2021/141884, filed Dec. 28, 2021, the contents of which are incorporated by reference in the entirety.

TECHNICAL FIELD

The present invention relates to display technology, more particularly, to a computer-implemented method, an apparatus, and a computer-program product.

BACKGROUND

Machine learning and neural networks have been used to analyze images for a variety of purposes. A neural network is a network including a plurality of hidden layers. A respective one of the plurality of hidden layers includes a plurality of neurons (e.g., nodes). A plurality of neurons in a respective one of the plurality of hidden layers are connected with a plurality of neurons in an adjacent one of the plurality of hidden layers. Connects between neurons have different weights. The neural network has a structure mimics a structure of a biological neural network. The neural network can solve problems using a non-deterministic manner.

SUMMARY

In one aspect, the present disclosure provides a computer-implemented method, comprising inputting a low-resolution image and a plurality of high-resolution images into a feature extractor, the low-resolution image and the plurality of high-resolution images comprising images of a target object; obtaining, by the feature extractor, feature maps of the low-resolution image and the plurality of high-resolution images; comparing similarities between the feature maps of the low-resolution image and the plurality of high-resolution images; obtaining selected feature maps of one or more selected high-resolution images of the plurality of high-resolution images most similar to the low-resolution image; inputting the selected feature maps into a generator to output a repair image; enhancing the low-resolution image using a pre-processing image enhancing process to generate an enhanced image; and morphing the repair image with the enhanced image.

Optionally, the low-resolution image is a facial image, and the target object is a face of a subject.

Optionally, the low-resolution image and the plurality of high-resolution images are facial images of frames of images in a video.

Optionally, the computer-implemented method further comprises establishing a first database comprising the plurality of high-resolution images and a second database comprising a plurality of image parameters associated with the plurality of high-resolution images by receiving a plurality of frames of image of a video; determining presence or absence of at least one target object in a respective frame of image of the plurality of frames of image, a number of target object in the respective frame of image, and a position of target object in the respective frame of image; and determining a resolution of a target image of the target object, when present, in the respective frame of image.

Optionally, the computer-implemented method further comprises storing a sequential number of the respective frame of image, the presence or absence of at least one target object in the respective frame of image, the number of target object in the respective frame of image, the position of target object in the respective frame of image, and a target identifier in the second database.

Optionally, the computer-implemented method further comprises performing target recognition on the respective frame of image in which at least one target object is present; and storing one or more target images having a resolution greater than a threshold resolution and a target identifier associated with the target object in the first database, the plurality of high-resolution images comprising the one or more target images.

Optionally, the computer-implemented method further comprises calculating similarity scores among the feature maps of the low-resolution image and the plurality of high-resolution images; wherein the one or more selected high-resolution images most similar to the low-resolution image are selected based on their differences in similarity scores with respect to the low-resolution image being below a threshold value.

Optionally, the feature extractor comprises a first concatenation layer configured to concatenate the low-resolution image and the plurality of high-resolution images; a plurality of convolutional layers connected in series; and one or more fully connected layer; wherein the feature extractor is configured to output similarity scores of the low-resolution image and similarity scores of the plurality of high-resolution images from a last one of the one or more fully connected layer, and configured to output feature maps of the low-resolution image and the plurality of high-resolution images from an intermediate convolutional layer of the plurality of convolutional layers.

Optionally, inputting the selected feature maps into a generator to output a repair image comprises permuting and combining the selected feature maps of the one or more selected high-resolution images to obtain a fused feature map; extracting features from the fused feature map; and reconfiguring the features from the fused feature map into the repair image.

Optionally, the generator comprises a second concatenation layer configured to permute and combine the selected feature maps of the one or more selected high-resolution images to obtain a fused feature map; a resize layer connected to the second concatenation layer, and configured to resample the fused feature map into a fixed size; a plurality of encoding modules arranged in series, wherein the fixed size fused feature map is input to a first one of the plurality of encoding modules; a plurality of decoding modules arranged in series; and at least one concatenation between a respective one of the plurality of encoding modules and a respective one of the plurality of decoding modules; wherein through the at least one concatenation between a respective one of the plurality of encoding modules and a respective one of the plurality of decoding modules, an output from the respective one of the plurality of encoding modules and an output from a decoding module at an immediate previous stage to the respective one of the plurality of decoding modules are concatenated as input to the respective one of the plurality of decoding modules.

Optionally, a difference between a number of the plurality of decoding modules and a number of the plurality of encoding modules is correlated to a number of times image resolution has increased from the low-resolution image to the repair image.

Optionally, a respective one of the plurality of encoding modules comprises a convolutional layer, a rectified linear unit connected to the convolutional layer, and a plurality of residual blocks arranged in series; and a respective one of the plurality of decoding modules comprises a plurality of residual blocks arranged in series, a deconvolutional layer or a pixel shuffle layer, a rectified linear unit connected to the deconvolutional layer or the pixel shuffle layer, and a convolutional layer connected to the rectified linear unit.

Optionally, morphing the repair image with the enhanced image comprises constructing a mask having a target area corresponding to a respective target image and a background area outside the target area; and performing a filtering process on the mask to generate a filtered mask having a target portion corresponding to the respective target image and a background portion outside the target portion.

Optionally, morphing the repair image with the enhanced image comprises generating a morphed image according to GMtarget×Itarget+(1−GMtarget)×Isr; wherein GMtarget stands for the target portion of the filtered mask; Itarget stands for the repair image; and Isr stands for the enhanced image generated by enhancing the low-resolution image using a pre-processing image enhancing process.

Optionally, the computer-implemented method further comprises using a feedback loop to train the generator based on at least one of a generator loss function and a discriminator loss function; wherein the generator is configured to output the repair image to a loss function calculator, and to a discriminator configured to determine whether the repair image is real or fake; the loss function calculator is configured to compute a generator loss function and a discriminator loss function based on the repair image; the feedback loop is configured to mutually train the generator and the discriminator, based on the generator loss function and the discriminator loss function; and the feedback loop comprises a first feedback loop for optimizing parameters of the generator and a second feedback loop for optimizing parameters of the discriminator.

Optionally, the generator loss function is configured to calculate one or more of a content loss, a first generative adversarial network (GAN) loss, a weighted L1 loss, and an eye area loss; wherein the content loss is expressed as:

$$L_{content} = \frac{1}{2C1}\sum_{ij}(F_{ij}^l - P_{ij}^l)^2,$$

wherein $L_{content}$ stands for the content loss, C1 is a constant for standardizing results; $P^l$ stands for a feature map output from a l-th layer of the loss function calculator with the low-resolution image as an input; and $F^l$ stands for a feature map output from the l-th layer of the loss function calculator with the repair image as an input;

wherein the first GAN loss is expressed as $L_G = -E_{x\sim Pdata(x)}[\log D(x)] - E_{z\sim Pz(z)}[1-\log D(G(z))]$;

wherein $L_G$ stands for the first GAN loss; z stands for an input of the generator; Pz stands for an input set of the generator; x stands for a true sample, Pdata stands for a set of true samples; D(x) stands for a result obtained after the true sample is input to the discriminator; G(z) stands for an output result of the generator; $E_{x\sim Pdata(x)}$ stands for that x is sampled from the true sample set, and subsequent operations are performed for any x; and $E_{z\sim Pz(z)}$ stands for that z is sampled from the input set Pz, and subsequent operations are performed for any z;

wherein the weighted L1 loss is expressed as L1=w1* (abs($R_i-R_g$))+w2*(abs($G_i-G_g$))+w3*(abs($B_i-B_g$));

wherein $R_i$, $G_i$, and $B_i$ stands for R, G, and B channels of the repair image from the generator, respectively, and $R_g$, $G_g$, and $B_g$ stands for R, G, and B channels of a reference image; w1, w2, and w3 stands for weights, respectively;

wherein the eye area loss is expressed as $L_{eye} = L_{content}(O_{eye}, G_{eye}) + L_{content}(O_{eye}[:,0: 0.5w], O_{eye}[:,0.5w: w]) + L_{content}(G_{eye}[:,0: 0.5w], G_{eye}[:,0.5w: w])$;

wherein $O_{eye}$ stands for a total eye area of the repair image; $G_{eye}$ stands for a total eye area of the reference image; and $L_{content}(O_{eye}, G_{eye})$ stands for a content loss between the reference image and the repair image; $O_{eye}[:,0: 0.5w]$ stands for a left half of the total eye area of the repair image and $O_{eye}[:,0.5w: w]$ stands for a right half of the total eye area of the repair image, provided a value of a width of the total eye area of the repair image increases from 0 on the left to w on the right; $G_{eye}[:,0: 0.5w]$ stands for a left half of the total eye area of the reference image and $G_{eye}[:,0.5w: w]$) stands for a right half of the total eye area of the reference image, provided a value of a width of the total eye area of the reference image increases from 0 on the left to w on the right; $L_{content}(O_{eye}[:,0: 0.5w], O_{eye}[:,0.5w: w])$ stands for a content loss between the left half and the right half of the total eye area of the repair image; and $L_{content}(G_{eye}[:, 0: 0.5w], G_{eye}[:, 0.5w: w])$ stands for a content loss between the left half and the right half of the total eye area of the reference image.

Optionally, the discriminator loss function is configured to calculate a second adversarial network (GAN) loss;

wherein the second GAN loss is expressed as $L_D = -E_{x\sim Pdata(x)}[\log D(x)] - E_{z\sim Pz(z)}[1-\log D(G(z))]$;

wherein $L_D$ stands for the second GAN loss; z stands for an input of the generator; Pz stands for an input set of the generator; x stands for a true sample, Pdata stands for a set of true samples; D(x) stands for a result obtained after the true sample is input to the discriminator; G(z) stands for an output result of the generator; $E_{x\sim Pdata(x)}$ stands for that x is sampled from the true sample set, and subsequent operations are performed for any x; and $E_{z\sim Pz(z)}$ stands for that z is sampled from the input set Pz, and subsequent operations are performed for any z.

Optionally, the computer-implemented method further comprises pre-training the generator using a feedback loop based on at least one of a generator loss function and a discriminator loss function; wherein the generator is pre-trained using a plurality of pairs of high-resolution reference images and low-resolution reference images; a plurality of low-resolution reference images in the plurality of pairs are generated using the plurality of high-resolution reference images in the plurality of pairs by down-sampling the plurality of high-resolution reference images to generate a plurality of down-sampled reference images; performing Gaussian blurring on the plurality of down-sampled reference images to generate a plurality of down-sampled and blurred reference images; and applying compression noise on the plurality of down-sampled and blurred reference images, thereby generating the plurality of low-resolution reference images.

In another aspect, the present disclosure provides an apparatus, comprising one or more memory; and one or more processors; wherein the one or more memory and the one or more processors are connected with each other; and the one or more memory stores computer-executable instructions for controlling the one or more processors to input a low-resolution image and a plurality of high-resolution images into a feature extractor, the low-resolution image and the plurality of high-resolution images comprising images of a target object; obtain, by the feature extractor, feature maps of the low-resolution image and the plurality of high-resolution images; compare similarities between the feature maps of the low-resolution image and the plurality of high-resolution images; obtain selected feature maps of one or more selected high-resolution images of the plurality of high-resolution images most similar to the low-resolution image; input the selected feature maps into a generator to output a repair image; enhance the low-resolution image using a pre-processing image enhancing process to generate an enhanced image; and morph the repair image with the enhanced image.

In another aspect, the present disclosure provides a computer-program product comprising a non-transitory tangible computer-readable medium having computer-readable instructions thereon, the computer-readable instructions being executable by a processor to cause the processor to perform inputting a low-resolution image and a plurality of high-resolution images into a feature extractor, the low-resolution image and the plurality of high-resolution images comprising images of a target object; obtaining, by the feature extractor, feature maps of the low-resolution image and the plurality of high-resolution images; comparing similarities between the feature maps of the low-resolution image and the plurality of high-resolution images; obtaining selected feature maps of one or more selected high-resolution images of the plurality of high-resolution images most similar to the low-resolution image; inputting the selected feature maps into a generator to output a repair image; enhancing the low-resolution image using a pre-processing image enhancing process to generate an enhanced image; and morphing the repair image with the enhanced image.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
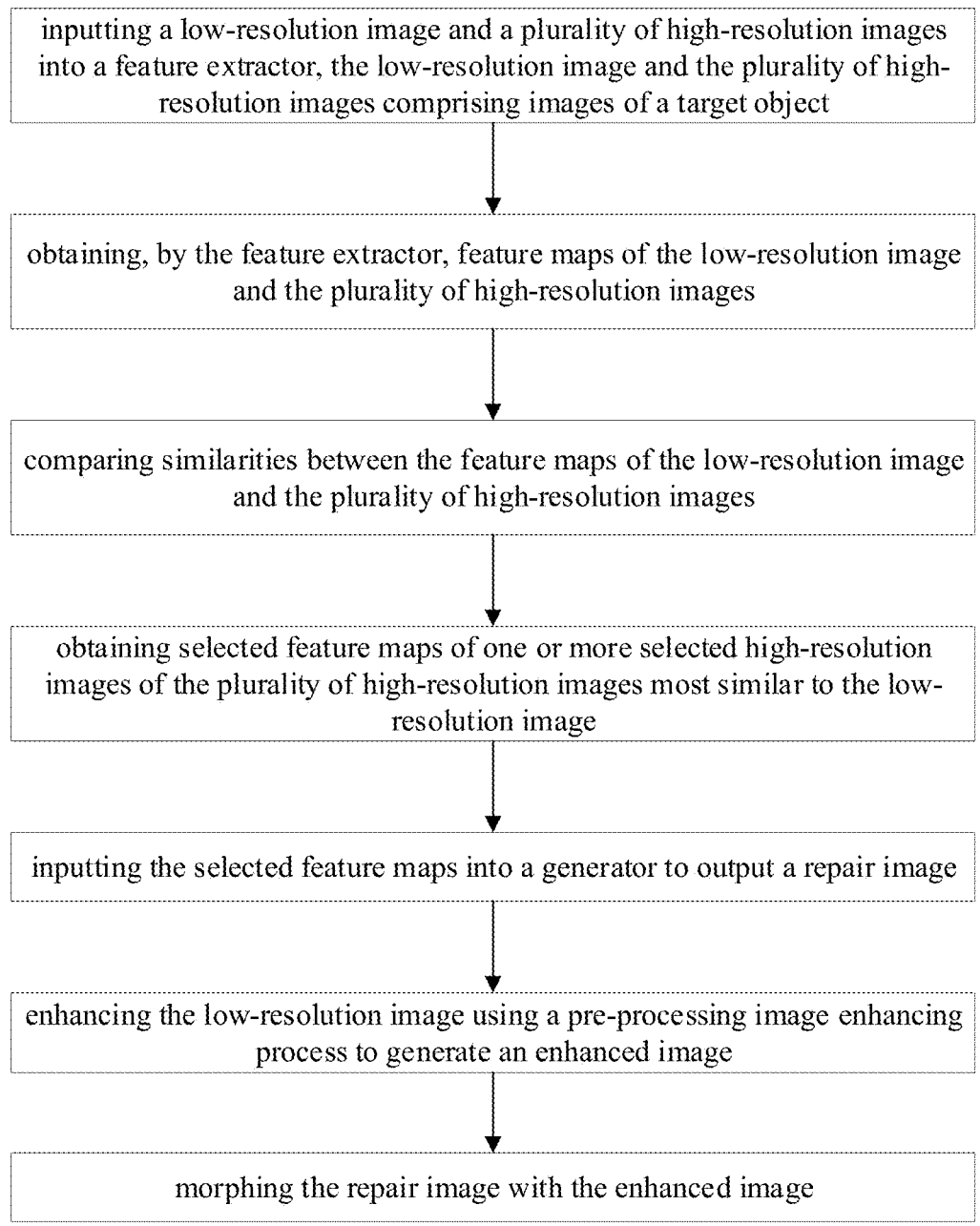
FIG. 1 illustrates a computer-implemented method in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a computer-implemented method, an apparatus, and a computer-program product that substantially obviate one or more of the problems due to limitations and disadvantages of the related art. In one aspect, the present disclosure provides a computer-implemented method. In some embodiments, the computer-implemented method includes inputting a low-resolution image and a plurality of high-resolution images into a feature extractor, the low-resolution image and the plurality of high-resolution images comprising images of a target object; obtaining, by the feature extractor, feature maps of the low-resolution image and the plurality of high-resolution images; comparing similarities between the feature maps of the low-resolution image and the plurality of high-resolution images; obtaining selected feature maps of one or more selected high-resolution images of the plurality of high-resolution images most similar to the low-resolution image; inputting the selected feature maps into a generator to output a repair image; enhancing the low-resolution image using a pre-processing image enhancing process to generate an enhanced image; and morphing the repair image with the enhanced image.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling layer can change a size of an input image to a size corresponding to a certain convolutional layer. The output from the up-sampling layer or the down-sampling layer can then be processed by a convolutional layer of a corresponding size. This enables the convolutional layer to add or extract a feature having a size different from that of the input image.

As used herein, the term "convolutional kernel" refers to a two-dimensional matrix used in a convolution process. Optionally, a respective one item of a plurality items in the two-dimensional matrix has a certain value.

As used herein, the term "convolution" refers to a process of processing an image. A convolutional kernel is used for a convolution. For, each pixel of an input image has a value, a convolution kernel starts at one pixel of the input image and moves over each pixel in an input image sequentially. At each position of the convolutional kernel, the convolutional kernel overlaps a few pixels on the image based on the scale of the convolution kernel. At a position of the convolutional kernel, a value of one of the few overlapped pixels is multiplied by a respective one value of the convolutional kernel to obtain a multiplied value of one of the few overlapped pixels. Subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution may extract different features of the input image using different convolution kernels. In another example, a convolution process may add more features to the input image using different convolution kernels.

As used herein, the term "convolutional layer" refers to a layer in a convolutional neural network. The convolutional layer is used to perform convolution on an input image to obtain an output image. Optionally, different convolution kernels are used to performed different convolutions on the same input image. Optionally, different convolution kernels are used to performed convolutions on different parts of the same input image. Optionally, different convolution kernels are used to perform convolutions on different input images, for example, multiple images are inputted in a convolutional layer, a respective convolutional kernel is used to perform a convolution on an image of the multiple images. Optionally, different convolution kernels are used according to different situations of the input image.

As used herein, the term "active layer" refers to a layer in a convolutional neural network. An active layer can perform a non-linear mapping on an output signal output from a convolutional layer. Various functions may be used in an active layer. Examples of functions suitable for being adopted in an active layer include, but are not limited to a rectified linear units (ReLU) function, a sigmoid function, and a hyperbolic tangent function (e.g., a tanh function). In one example, an active layer is not included in a convolutional layer. In another example, a convolutional layer includes an active layer.

In some embodiments, a convolutional layer is a core layer of a convolutional neural network. In a convolutional layer, a neuron is connected with some of neurons in a direct adjacent convolutional layer. Optionally, a convolutional layer applies a plurality of convolutional kernels to an input image to extract a plurality of features from the input image. A convolutional layer can extract a type of features from the input image. Optionally, an initialized convolutional kernel is a random fractional matrix. During the pre-training process of the convolutional neural network, the convolutional kernel obtains a reasonable value by learning.

Optionally, a result obtained by applying the convolutional kernel to an input image is called a feature map. The number of a plurality of feature maps is equivalent to the number of a plurality of convolutional kernels. A respective one of the plurality of feature maps corresponds to a respective one of the plurality of convolutional kernels.

Optionally, the respective one of the plurality of feature maps is formed by neurons rectangularly arranged. The neurons of the respective one of the plurality of feature maps share the respective one of the plurality of convolutional kernels.

Optionally, a convolutional neural network has a plurality of convolutional layers. A feature map output from a respective one of the plurality of convolutional layers is input into a downstream one of the plurality of convolutional layers. The downstream one of the plurality of convolutional layer processes the feature map output from the respective one of the plurality of convolutional layers and outputs a downstream feature map of the plurality of feature maps.

In some embodiments, a down-sampling layer is between two adjacent convolutional layers. In one example, a pooling layer is used to reduce the size of an input image to simplify the computational complexity and reduce the over-fitting phenomenon. In another example, the pooling layer can compress features and extract main features of the input image. Optionally, the pooling layer reduces a size of a respective one of the feature maps, but does not change the number of the feature maps. For example, an input image having a size of 12×12 is sampled by a 6×6 filter, subsequently, the 6×6 filter outputs an output image having a size of 2×2, which means the 144 pixels of the input image having the size of 12×12 is divided into four portions, each portion of the four portions of the 144 pixels has 36 pixels. subsequent to a pooling process using the 6×6 filter, the 36 pixels in each portion is combined into 1 pixel, and the output image generated has a size of 2×2.

As used herein, the term "pooling" refers to a type of down-sampling. Various methods may be used for pooling. Examples of methods suitable for pooling includes, but are not limited to, max-pooling, avg-polling, decimation, and demuxout. As used herein, the term "down-sampling" refers to a process of extracting features of an input image, and outputting an output image with a smaller size. As used herein, the term "up-sampling" refers to a process of adding more information to an input image, and outputting an outputting image with a larger scale.

FIG. 1 illustrates a computer-implemented method in some embodiments according to the present disclosure. Referring to FIG. 1, the computer-implemented method in some embodiments includes inputting a low-resolution image and a plurality of high-resolution images into a feature extractor, the low-resolution image and the plurality of high-resolution images comprising images of a target object; obtaining, by the feature extractor, feature maps of the low-resolution image and the plurality of high-resolution images; comparing similarities between the feature maps of the low-resolution image and the plurality of high-resolution images; obtaining selected feature maps of one or more selected high-resolution images of the plurality of high-resolution images most similar to the low-resolution image; inputting the selected feature maps into a generator to output a repair image; enhancing the low-resolution image using a pre-processing image enhancing process to generate an enhanced image; and morphing the repair image with the enhanced image.

In one example, the low-resolution image is a low-resolution facial image, and the target object is a face of a subject. In another example, the low-resolution image is a low-resolution facial image in a frame of image in a video. In another example, the low-resolution image and the plurality of high-resolution images are facial images of in frames of images in a video. In a specific example, the present method is used for improving quality of facial images in the video. The method includes detecting facial images in frames of images in the video; determining image resolutions of the facial images detected in the frames of images in the video; performing facial recognition on facial images having a relatively higher resolution; and storing these facial images in a facial image database. The method may further includes obtaining facial image parameters and storing the facial image parameters in a facial image parameter database. Examples of facial image parameters include serial numbers of the frames of images; presence or absence of facial image in the frames of images; image resolutions of the facial images; and positions of the facial images. The frames of images may be classified into at least three categories, based on the facial image database and the facial image parameter database. The categories include a first category, a second category, and a third category. In the first category, no facial image is detected in the frame of image. In the second category, one or more facial images are detected in the frame of image; and the one or more facial images are of a relatively high image resolution. In the third category, one or more facial images are detected in the frame of image; however, the one or more facial images are of a relatively low image resolution. In the specific example, the method includes enhancing the image resolution of the one or more facial images in the third category, based on the facial image database, the facial image parameter database, and an image-enhancing model, to obtain a repair image. The repair image is then morphed with an enhanced image generated by a pre-processing image enhancing process. Using the present computer-implemented method, low-resolution facial images in videos and movies can be restored to high-resolution facial images, significantly enhancing user experience.

Figure 2:
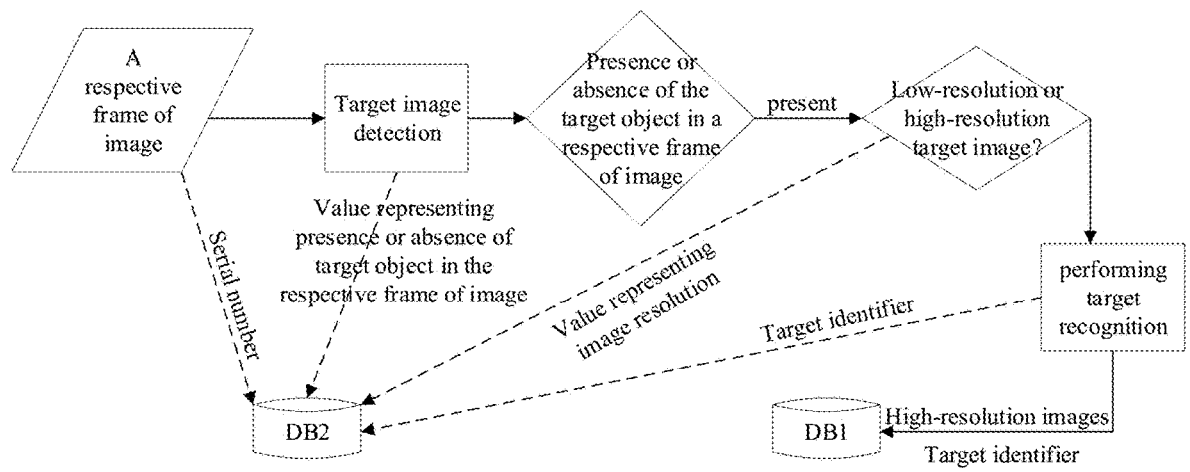
FIG. 2 illustrates a process of establishing a first database including the plurality of high-resolution images and a second database including a plurality of image parameters associated with the plurality of high-resolution images in some embodiments according to the present disclosure.

In some embodiments, the computer-implemented method includes establishing a first database including the plurality of high-resolution images and a second database including a plurality of image parameters associated with the plurality of high-resolution images. FIG. 2 illustrates a process of establishing a first database including the plurality of high-resolution images and a second database including a plurality of image parameters associated with the plurality of high-resolution images in some embodiments according to the present disclosure. Referring to FIG. 2, in some embodiments, the step of establishing the first database DB1 and the second database DB2 includes receiving a plurality of frames of image of a video; and counting serial numbers of the plurality of frames of image. The serial numbers are stored in the second database DB2.

In some embodiments, the step of establishing the first database DB1 and the second database DB2 further includes performing target image detection in the respective frame of image. Specifically, the step includes determining presence or absence of the target object in a respective frame of image of the plurality of frames of image. Optionally, counting a serial number of the respective frame of image and determining the presence or absence of the target object in the respective frame of image may be performed in a same step. For example, each time the method determines the presence or absence of the target object in the respective frame of image, the method also counts the serial number of the respective frame of image, and stores it in the second database DB2.

Optionally, when no target object is detected in the respective frame of image, a value of 0 is assigned, representing absence of the target object in the respective frame of image. The value is stored in the second database DB2.

Optionally, when n number of target objects are detected in the respective frame of image, $n \geq 1$, a value of n is assigned, representing n number of target objects being detected in the respective frame of image. The value n is stored in the second database DB2.

In some embodiments, the step of establishing the first database DB1 and the second database DB2 further includes determining a position of the target object in the respective frame of image. The position of the target object is stored in the second database DB2.

In one example, when no target object is detected in the respective frame of image, a value of −1 is assigned for the information corresponding to the position of the target object.

In another example, when at least one target object is detected in the respective frame of image, the position of the target object is represented as [xc, yc, w, h], wherein [xc, yc] stand for coordinates of a central point of the target object, [w, h] stand for a width and a length of a rectangular target object area containing the target object detected in the respective frame of image.

In another example, when n number of target objects are detected in the respective frame of image, the position of the target object is represented as [xc1, yc1, w1, h1], [xc2, yc2, w2, h2], ..., [xcn, ycn, wn, hn], wherein [xc1, yc1], [xc2, yc2], ..., [xcn, ycn] stand for coordinates of central points of the n number of target objects, [w1, h1], [w2, h2], ..., [wn, hn] stand for widths and lengths of rectangular target object areas respectively containing the n number of target objects detected in the respective frame of image.

In some embodiments, the step of establishing the first database DB1 and the second database DB2 further includes determining a resolution of an image of the target object, when present, in the respective frame of image. When more than one target objects are detected, resolutions of images of the target objects are respectively determined.

In one example, when no target object is detected in the respective frame of image, a value of −1 is assigned for the information corresponding to the resolution of an image of the target object.

In another example, at least one target object is detected in the respective frame of image, the resolution of a respective target image may be represented numeric numbers, e.g., 1 to k, wherein k>1, k represents the highest resolution, 1 represents the lowest resolution. In one specific example, k=5. The value representing the resolution of a respective target image is stored in the second database DB2. A threshold resolution may be represented using a value t. When the resolution of a respective target image has a value greater than t, the respective target image may be classified as a high-resolution image. When the resolution of a respective target image has a value equal to or less than t, and is not −1, the respective target image may be classified as a low-resolution image. In one specific example, k=5, and t=3.

In some embodiments, the step of establishing the first database DB1 and the second database DB2 further includes performing target recognition, when the target object is present, on the plurality of frames of image in the video. When a target object is recognized to be associated with a specific subject, a target identifier is provided, and the target image is labeled with the target identifier. Optionally, one or more target images having a resolution greater than a threshold resolution and a target identifier associated with the target object are stored in the first database DB1. The one or more target images having a resolution greater than the threshold resolution are parts of the plurality of high-resolution images.

In one example, the first database DB1 includes a folder for a subject 1. When the one or more target images having a resolution greater than the threshold resolution are recognized as target images of the subject 1, they are stored in the folder for the subject 1 in the first database DB1.

Optionally, one or more target images having a resolution equal to or less than the threshold resolution are recognized to be associated with a specific subject, a target identifier is provided. The information on the target identifier associated with the one or more target images having the resolution equal to or less than the threshold resolution is stored in the second database DB2. However, the one or more target images having the resolution equal to or less than the threshold resolution are not stored in the first database DB1.

TABLE 1

Data stored in a second database

| Serial Number | Value representing presence or absence of target object in the respective frame of image | position of the target object in the respective frame of image | resolution | Target identifier |
|---|---|---|---|---|
| 1 | 0 | −1 | −1 | −1 |
| 2 | 4 | [[x1, y1, w1, h1], [x2, y2, w2, h2], [x3, y3, w3, h3], [x4, y4, w4, h4]] | [1, 4, 4, 2] | [1, 2, 3, 4] |
| 3 | 3 | [[x5, y5, w5, h5], [x6, y6, w6, h6], [x7, y7, w7, h7]] | [1, 4, 2] | [1, 3, 5] |

Table 1 shows an example of data stored in a second database. As shown in Table 1, a sequential number of the respective frame of image, the presence or absence of the target object in the respective frame of image, the number of the target object in the respective frame of image, the position of the target object in the respective frame of image, and the target identifier are stored in the second database. A value representing presence or absence of target object in the respective frame of image of 0 indicates no target object is detected in the respective frame of image. A value representing presence or absence of target object in the respective frame of image of 3 indicates a total of three target objects are detected in the respective frame of image. A value of −1 for the position of the target object in the respective frame of image indicates no target object is detected in the respective frame of image. A value of −1 for the resolution indicates no target object is detected in the respective frame of image. A value of [1,4,4,2] for the resolution indicates resolutions for four target objects detected, respectively, in a frame of image with a serial number 2. A value of [1,4,2] for the resolution indicates resolutions for three target objects detected, respectively, in a frame of image with a serial number 3. A greater value (e.g., 4) indicates a higher resolution than a smaller value (e.g., 1). A value of −1 for the target identifier indicates no target object is detected in the respective frame of image. A value of [1,2,3,4] indicates target identifiers for four target objects detected and recognized, respectively, in the frame of image with the serial number 2. A value of [1,3,5] indicates target identifiers for three target objects detected and recognized, respectively, in the frame of image with the serial number 3.

Various models may be used for target image detection. Examples of target image detection models include a yolov5 model, a resnet18 model, a R-CNN model, and a mobilenet model.

Various models may be used for determining image resolution. Examples of image resolution determination models include a resnet18 model, a mobilenet model, an inception v3 model, and an SSR_Net model.

Various models may be used for performing target recognition. Examples of target recognition models include a DeepFace network, a DeepID network, a FaceNet network.

In some embodiments, the first database may include high-resolution target images obtained from various sources, including public sources.

In some embodiments, the plurality of high-resolution images includes target images of a same subject having different expressions and/or taken from different angles.

In some embodiments, the computer-implemented method further includes calculating similarity scores among the feature maps of the low-resolution image and the plurality of high-resolution images. Optionally, differences in similarity scores between the one or more selected high-resolution images and the low-resolution image is below a threshold value. The one or more selected high-resolution images having differences in similarity scores with respect to the low-resolution image below the threshold value are considered as high-resolution images most similar to the low-resolution image.

Figure 3:
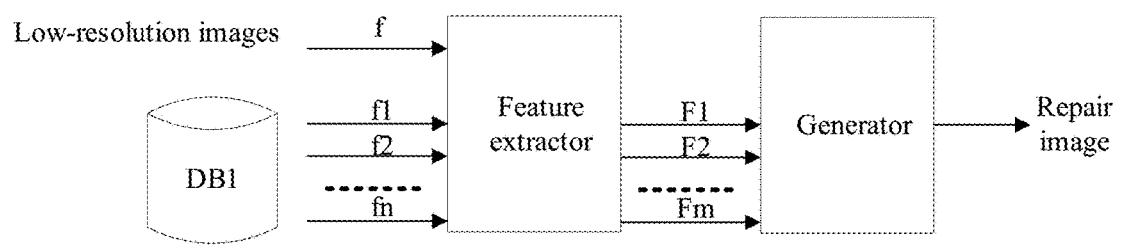
FIG. 3 illustrates a process of calculating similarity scores and repairing image in some embodiments according to the present disclosure.

FIG. 3 illustrates a process of calculating similarity scores and repairing image in some embodiments according to the present disclosure. Referring to FIG. 3, a feature extractor is configured to calculate similarity scores. In one example, the low-resolution image/has a similarity score of s, and the plurality of high-resolution images $f_1, f_2, \ldots, f_n$, have similarity scores $s_1, s_2, \ldots, s_n$. By comparing the similarity scores $s_1, s_2, \ldots, s_n$ with the similarity score s, m number of selected high-resolution images are selected as ones having differences in similarity scores with respect to the low-resolution image below the threshold value. The feature extractor is configured to extract feature maps of the plurality of high-resolution images. Feature maps of the m number of selected high-resolution images, $[F_1, F_2, \ldots, F_m]$, can be obtained.

In one specific example, a similarity score may be represented numeric numbers, e.g., 1 to p, wherein p>1, p represents the highest similarity, and 1 represents the lowest similarity.

Various models may be used for target image detection. Examples of target image detection models include a VGG model, a yolov5 model, a resnet18 model, a R-CNN model, and a mobilenet model.

Figure 4:
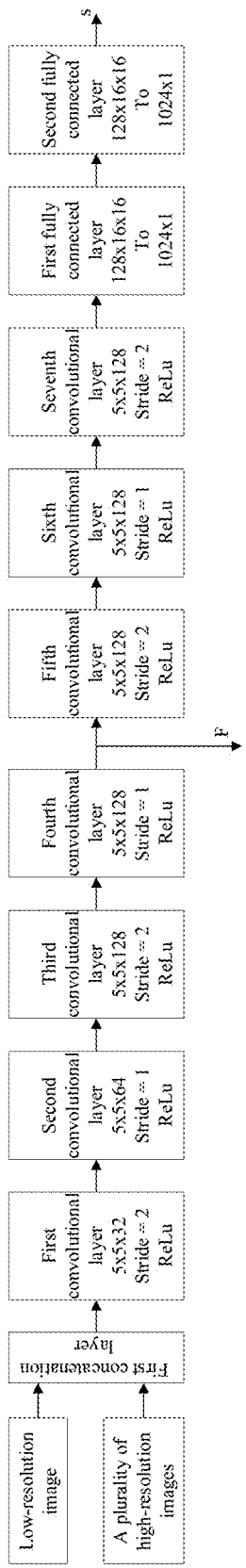
FIG. 4 illustrates the structure of a feature extractor in some embodiments according to the present disclosure.

In some embodiments, the feature extractor includes a first concatenation layer, a plurality of convolutional layers, and one or more fully connected layer. FIG. 4 illustrates the structure of a feature extractor in some embodiments according to the present disclosure. Referring to FIG. 4, the feature extractor in some embodiments includes a first concatenation layer configured to concatenate the low-resolution image and the plurality of high-resolution images; a plurality of convolutional layers connected in series; a first fully connected layer; and a second fully connected layer. The output of the feature extractor includes similarity scores s, which includes the similarity score of the low-resolution image, and similarity scores of the plurality of high-resolution images.

In one example, the plurality of convolutional layers include a first convolutional layer having 32 number of kernels with the kernel size of 5×5, with a stride of 2, and including a ReLu function; a second convolutional layer having 64 number of kernels with the kernel size of 5×5, with a stride of 1, and including a ReLu function; a third convolutional layer having 128 number of kernels with the kernel size of 5×5, with a stride of 2, and including a ReLu function; a fourth convolutional layer having 128 number of kernels with the kernel size of 5×5, with a stride of 1, and including a ReLu function; a fifth convolutional layer having 128 number of kernels with the kernel size of 5×5, with a stride of 2, and including a ReLu function; a sixth convolutional layer having 128 number of kernels with the kernel size of 5×5, with a stride of 1, and including a ReLu function; and a seventh convolutional layer having 128 number of kernels with the kernel size of 5×5, with a stride of 2, and including a ReLu function.

In some embodiments, the similarity scores s are output from the second fully connected layer.

In some embodiments, feature maps of the low-resolution image and the plurality of high-resolution images are output from an intermediate convolutional layer, for example, from the fourth convolutional layer in FIG. 4.

Referring to FIG. 3 again, the computer-implemented method in some embodiments further includes inputting the selected feature maps (e.g., feature maps of the mi number of selected high-resolution images, $[F_1, F_2, \ldots, F_m]$), into a generator to output a repair image.

Figure 5:
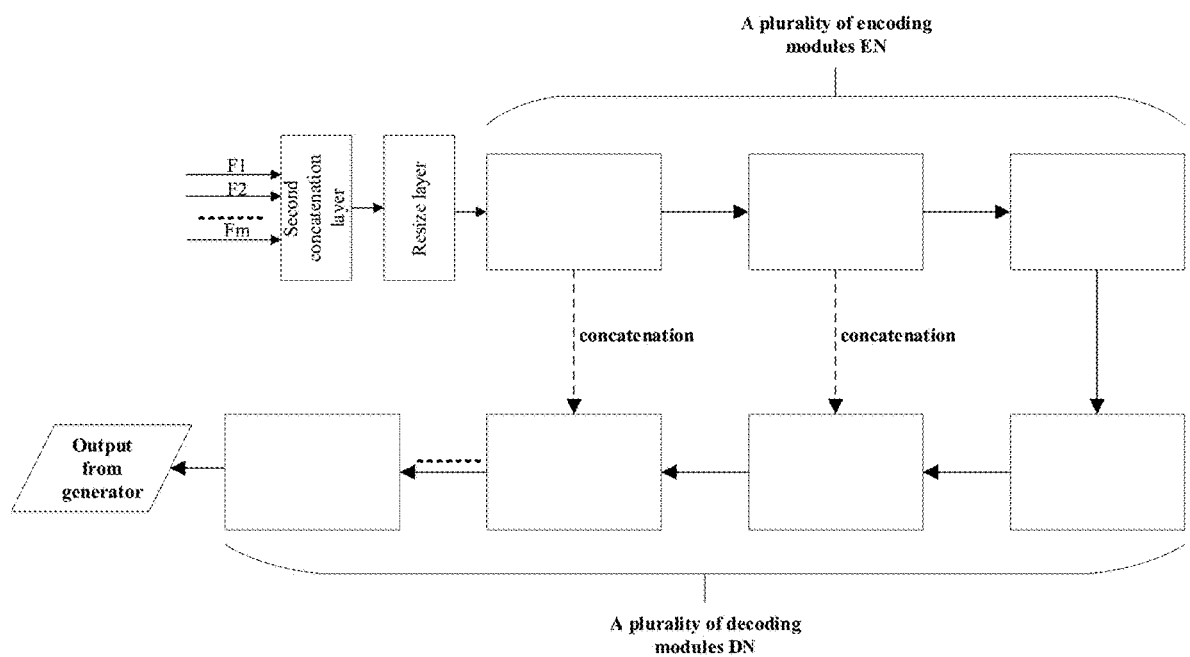
FIG. 5 is a schematic diagram illustrating the structure of a generator in some embodiments according to the present disclosure.

FIG. 5 is a schematic diagram illustrating the structure of a generator in some embodiments according to the present disclosure. Referring to FIG. 5, the generator in some embodiments includes a second concatenation layer, a resize layer connected to the second concatenation layer, a plurality of encoding modules EN arranged in series, a plurality of decoding modules DN arranged in series, and at least one concatenation between a respective one of the plurality of encoding modules EN and a respective one of the plurality of decoding modules DN. Optionally, through the at least one concatenation between the respective one of the plurality of encoding modules EN and the respective one of the plurality of decoding modules DN, an output from the respective one of the plurality of encoding modules EN and an output from a decoding module at an immediate previous stage to the respective one of the plurality of decoding modules DN are concatenated as input to the respective one of the plurality of decoding modules EN.

Optionally, the second concatenation layer is configured to permute and combine feature maps of the m number of selected high-resolution images, $[F_1, F_2, \ldots, F_m]$, to obtain a fused feature map. Optionally, the resize layer is configured to resample the fused feature map into a fixed size. For example, the fused feature map has a size of (B, C×m, H, W), and the resize layer is configured to resample the fused feature map into a size of (B, C, H, W).

In some embodiments, a number of the plurality of decoding modules DN is greater than the number of the plurality of encoding modules EN. Optionally, a difference Δ between the number of the plurality of decoding modules DN and the number of the plurality of encoding modules EN is correlated to a number of times E image resolution has increased from the low-resolution image to the repair image. Optionally, $E=2^Δ$. For example, when Δ=1, the image resolution doubles from the low-resolution image to the repair image. When Δ=2, the image resolution of the repair image is four times of the image resolution of the low-resolution image.

Figure 6:
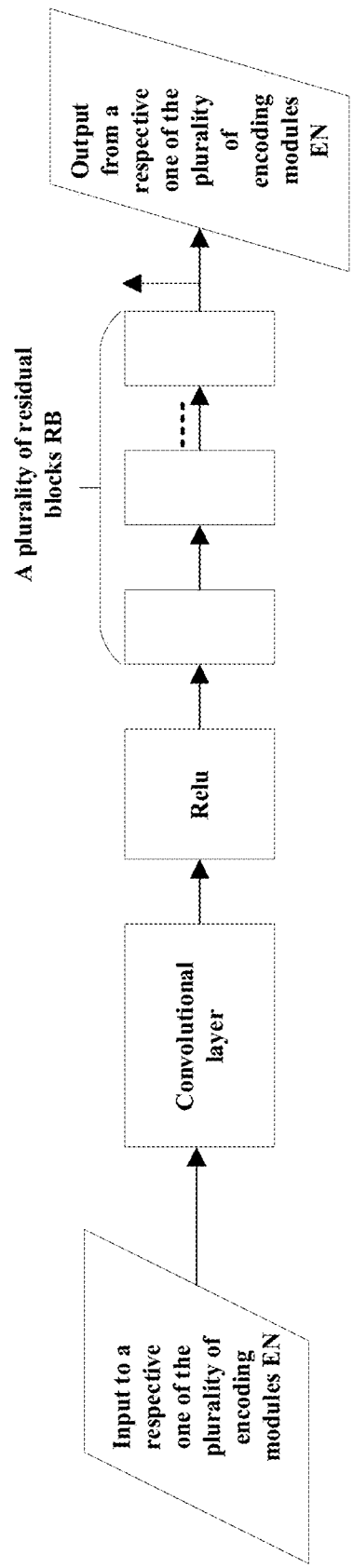
FIG. 6 is a schematic diagram illustrating the structure of a respective one of a plurality of encoding modules in some embodiments according to the present disclosure.

FIG. 6 is a schematic diagram illustrating the structure of a respective one of a plurality of encoding modules in some embodiments according to the present disclosure. Referring to FIG. 6, in some embodiments, a respective one of the plurality of encoding modules EN includes a convolutional layer, a rectified linear unit ReLu connected to the convolutional layer, and a plurality of residual blocks RB arranged in series. Optionally, the convolutional layer is a down-sampling convolutional layer, e.g., a 2× down-sampling convolutional layer.

Figure 7:
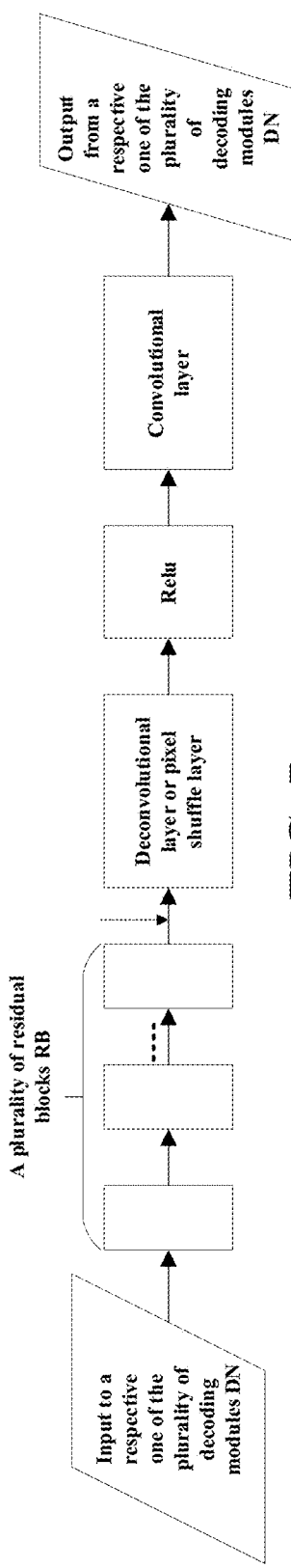
FIG. 7 is a schematic diagram illustrating the structure of a respective one of a plurality of decoding modules in some embodiments according to the present disclosure.

FIG. 7 is a schematic diagram illustrating the structure of a respective one of a plurality of decoding modules in some embodiments according to the present disclosure. Referring to FIG. 7, in some embodiments, a respective one of the plurality of decoding modules DN includes a plurality of residual blocks RB arranged in series, a deconvolutional layer or a pixel shuffle layer, a rectified linear unit ReLu connected to the deconvolutional layer or the pixel shuffle layer, and a convolutional layer connected to the rectified linear unit ReLu.

Figure 8:
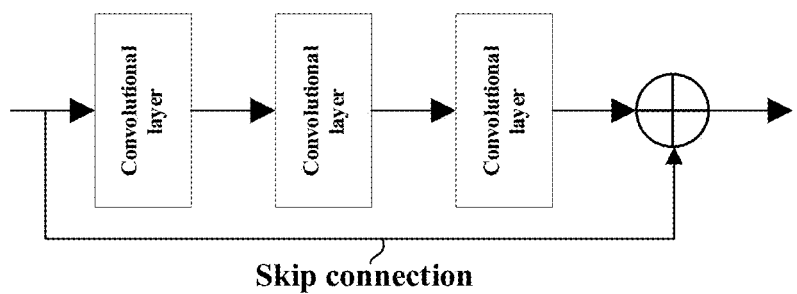
FIG. 8 is a schematic diagram illustrating the structure of a respective one of a plurality of residual blocks in some embodiments according to the present disclosure.

FIG. 8 is a schematic diagram illustrating the structure of a respective one of a plurality of residual blocks in some embodiments according to the present disclosure. Referring to FIG. 8, a respective one of the plurality of second residual blocks RB includes a plurality of convolutional layers and one or more skip connections for performing identity mapping.

Figure 9:
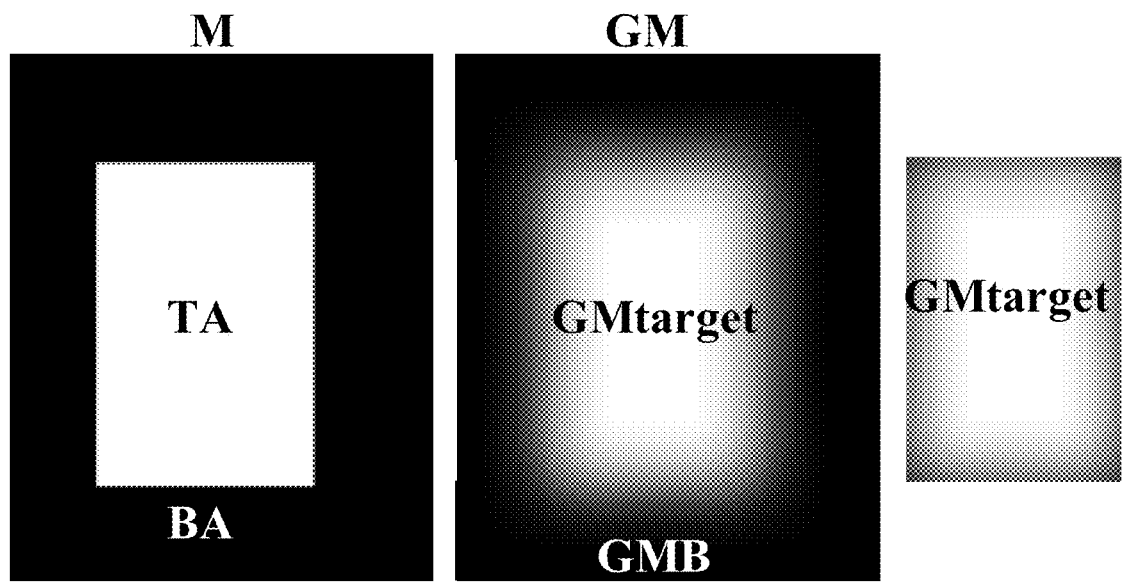
FIG. 9 illustrates a process of morphing a repair image with an enhancedimage in some embodiments according to the present disclosure.

In some embodiments, morphing the repair image with the enhanced image includes generating a mask. FIG. 9 illustrates a process of morphing a repair image with an enhanced image in some embodiments according to the present disclosure. Referring to FIG. 9, the mask M is constructed having a target area TA corresponding to a respective target image (e.g., a facial image) and a background area BA outside the target area TA. In one example, pixels in the background area BA may be assigned a value of 0, and pixels in the target area TA may be assigned a value of 1.

In some embodiments, morphing the repair image with the enhanced image further includes performing a filtering process on the mask M to generate a filtered mask GM. Optionally, the filtering process is a Gaussian filtering process. In one example, the Gaussian filtering process is a Gaussian blurring filtering process. The filtered mask GM is constructed having a target portion GMtarget corresponding to a respective target image (e.g., a facial image) and a background portion GMB outside the target portion GMtarget.

In some embodiments, morphing the repair image with the enhanced image further includes generating a morphed image. Optionally, the morphed image may be generated according to GMtarget×Itarget+(1−GMtarget)×Isr, wherein GMtarget stands for the target portion of the filtered mask GM, Itarget stands for the repair image, and Isr stands for the enhanced image generated by enhancing the low-resolution image using a pre-processing image enhancing process. Examples of pre-processing image enhancing techniques include a DUF network, an EDVR network, a RFDN network, and a Unet network. The pre-processing image enhancing process may also be used to enhance a frame of image in which target objects are absent.

In one specific example, the Gaussian filtering process uses a dynamic filter kernel with a kernel length of ⅕ to ¼ of the longest side of a target area among all sides of all target areas in the present frame of image. The purpose of using the Gaussian filtering process is to soften the edges of the morphed image, avoiding segmented edges.

Figure 10:
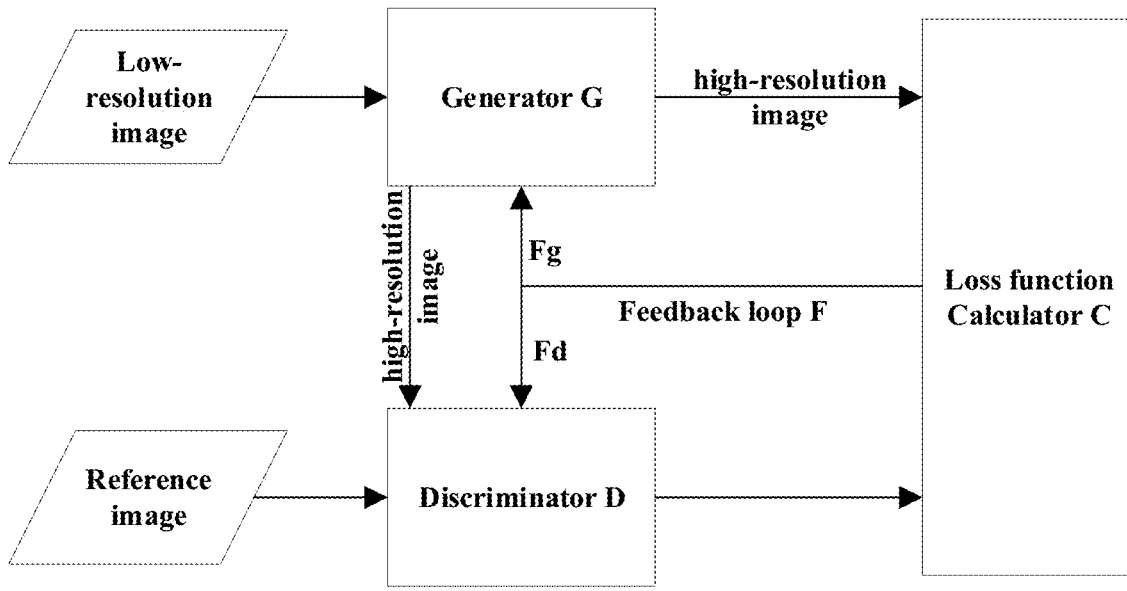
FIG. 10 is a schematic diagram illustrating the structure of an apparatus for implementing a computer-implemented method in some embodiments according to the present disclosure.

In some embodiments, the computer-implemented method further includes using a feedback loop to train the generator based on at least one of a generator loss function and a discriminator loss function. FIG. 10 is a schematic diagram illustrating the structure of an apparatus for implementing a computer-implemented method in some embodiments according to the present disclosure. Referring to FIG. 10, the apparatus for implementing a computer-implemented method in some embodiments includes a generator G, a loss function calculator C, a discriminator D, and a feedback loop F. The generator G is configured to receive a low-resolution image as an input, and output a high-resolution image (e.g., the repair image) to the loss function calculator C.

In some embodiments, the generator G further outputs the high-resolution image (e.g., the repair image) to the discriminator D. The discriminator D is configured to receive the high-resolution image, and determine whether the high-resolution image is real or fake.

In some embodiments, the discriminator D is further configured to receive a reference image (e.g., a high-resolution actual image, e.g., "true sample"), and determine whether the high-resolution image is real or fake.

The loss function calculator C in some embodiments computes a generator loss function and a discriminator loss function based on the high-resolution image. The feedback loop F is configured to mutually train the generator G and the discriminator D, based on the generator loss function and the discriminator loss function. The feedback loop F includes a first feedback loop Fg for optimizing parameters of the generator G; and a second feedback loop Fd for optimizing parameters of the discriminator D.

In some embodiments, the generator loss function is configured to calculate one or more of a content loss, a first generative adversarial network (GAN) loss, a weighted L1 loss, and an eye area loss. In some embodiments, the discriminator loss function is configured to calculate a second GAN loss.

In some embodiments, the method includes calculating a content loss. In a loss function calculator, the output of each convolutional layer is a feature of the input image. Assuming a certain convolutional layer with $N_l$ convolution kernels, and its output contains $N_l$ feature images, and assuming that the size of each feature image is $M_l$ (the width×length of the feature image). The output of layer/can be stored in the matrix $F^l \in \pi R^{N_l * M_l}$; wherein $F^l$ stands for a value of the j-th position in the feature image output by the i-th convolution kernel in the l-th layer.

In some embodiments, the content loss may be expressed as:

$$L_{content} = \frac{1}{2C1} \sum_{ij} (F_{ij}^l - P_{ij}^l)^2;$$

wherein $L_{content}$ stands for the content loss, C1 is a constant for standardizing results; $P^l$ stands for a feature map output from the l-th layer of the loss function calculator with an original image (e.g., the low-resolution image) as an input; and $F^l$ stands for a feature map output from the l-th layer of the loss function calculator with a generated image (e.g., the repair image) as an input.

In some embodiments, the first GAN loss may be expressed as:

$$L_G = -E_{x \sim Pdata(x)}[\log D(x)] - E_{z \sim Pz(z)}[1-\log D(G(z))].$$

In some embodiments, the second GAN loss may be expressed as:

$$L_D = -E_{x \sim Pdata(x)}[\log D(x)] - E_{z \sim Pz(z)}[1-\log D(G(z))].$$

Optionally, $L_G$ stands for the first GAN loss; $L_D$ stands for the second GAN loss; z stands for an input of the generator; Pz stands for an input set of the generator; x stands for a true sample, Pdata stands for a set of true samples; D(x) stands for a result obtained after the true sample is input to the discriminator; G(z) stands for an output result of the generator; $E_{x \sim Pdata(x)}$ stands for that x is sampled from the true sample set, and subsequent operations are performed for any x; and $E_{z \sim Pz(z)}$ stands for that z is sampled from the input set Pz, and subsequent operations are performed for any z.

In some embodiments, the weighted L1 loss may be expressed as:

$$L1 = w1*(abs(R_t - R_g)) + w2*(abs(G_t - G_g)) + w3*(abs(B_t - B_g));$$

wherein $R_t$, $G_t$, and $B_t$ stands for R, G, and B channels of an output image from the generator (e.g., the repair image), respectively, and $R_g$, $G_g$, and $B_g$ stands for R, G, and B channels of a reference image (e.g., a high resolution high quality image); w1, w2, and w3 stands for weights, respectively. In one specific example, w1=0.299, w2=0.587, and w3=0.114.

In some embodiments, the eye area loss is used to improve the authenticity of the repair image, particularly the authenticity and symmetry of eye image in the repair image. In one example, a length and width of the eye area is defined as h and w, respectively. In some embodiments, the eye area loss may be expressed as:

$$L_{eye} = L_{content}(O_{eye}, G_{eye}) + L_{content}(O_{eye}[:,0:0.5w], O_{eye}[:,0.5w:w]) + L_{content}(G_{eye}[:,0:0.5w], G_{eye}[:,0.5w:w]);$$

wherein $O_{eye}$ stands for a total eye area of an output image from the generator (e.g., the repair image); $G_{eye}$ stands for a total eye area of the reference image; and $L_{content}(O_{eye}, G_{eye})$ stands for a content loss between the reference image and the output image from the generator. $O_{eye}[:,0:0.5w]$ stands for a left half of the total eye area of the output image from the generator and $O_{eye}[:,0.5w:w]$ stands for a right half of the total eye area of the output image from the generator, provided a value of a width of the total eye area of the output image from the generator increases from 0 on the left to w on the right. $G_{eye}[:,0:0.5w]$ stands for a left half of the total eye area of the reference image and $G_{eye}[:,0.5w:w]$) stands for a right half of the total eye area of the reference image, provided a value of a width of the total eye area of the reference image increases from 0 on the left to w on the right. $L_{content}(O_{eye}[:,0:0.5w], O_{eye}[:,0.5w:w])$ stands for a content loss between the left half and the right half of the total eye area of the output image from the generator. $L_{content}(G_{eye}[:,0:0.5w], G_{eye}[:,0.5w:w])$ stands for a content loss between the left half and the right half of the total eye area of the reference image.

In some embodiments, the computer-implemented method further includes pre-training the generator using the feedback loop based on at least one of a generator loss function and a discriminator loss function. Optionally, the generator is pre-trained using a plurality of pairs of high-resolution reference images and low-resolution reference images. Optionally, the plurality of high-resolution images stored in the first database (DB1 in FIG. 2) are used as a plurality of high-resolution reference images in the plurality of pairs. Optionally, a plurality of low-resolution reference images in the plurality of pairs are generated using the plurality of high-resolution reference images (e.g., the plurality of high-resolution images stored in the first database).

In some embodiments, generating the plurality of low-resolution reference images using the plurality of high-resolution reference images includes down-sampling the plurality of high-resolution reference images. Optionally, the down-sampling may be a 2× down-sampling process, a 3×down-sampling process, a 4× down-sampling process, and so on.

In some embodiments, generating the plurality of low-resolution reference images using the plurality of high-resolution reference images further includes performing Gaussian blurring on the plurality of high-resolution reference images.

In some embodiments, generating the plurality of low-resolution reference images using the plurality of high-resolution reference images further includes applying compression noise to the plurality of high-resolution reference images.

In some embodiments, generating the plurality of low-resolution reference images using the plurality of high-resolution reference images includes down-sampling the plurality of high-resolution reference images to generate a plurality of down-sampled reference images; performing Gaussian blurring and applying compression noise on the plurality of down-sampled reference images, thereby generating the plurality of low-resolution reference images. In one example, the process may be represented by inx=JPEG{Gauss[DownSample(GT)]}, wherein inx stands for the plurality of low-resolution reference images in the plurality of pairs; GT stands for the plurality of high-resolution reference images in the plurality of pairs; DownSample stands for a down-sampling operator; Gauss stands for a Gaussian blurring operator; and JPEG stands for a JPEG compression operator.

Figure 11:
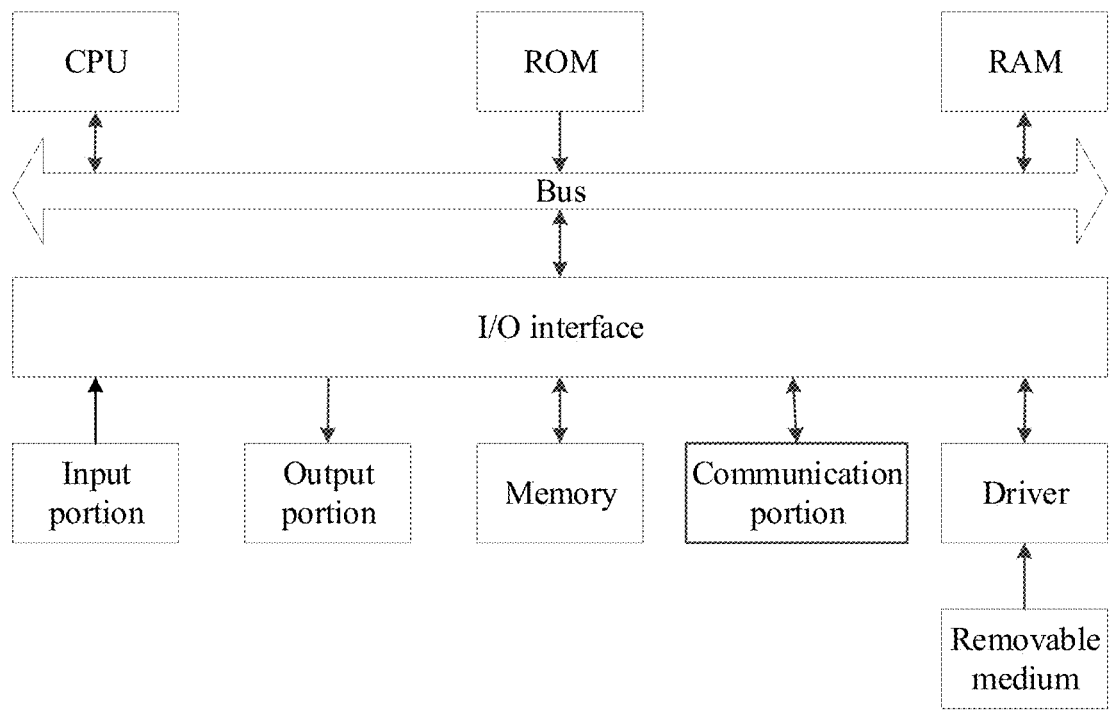
FIG. 11 is a schematic diagram of a structure of an apparatus in some embodiments according to the present disclosure.

In another aspect, the present disclosure provides an apparatus. FIG. 11 is a schematic diagram of a structure of an apparatus in some embodiments according to the present disclosure. Referring to FIG. 11, in some embodiments, the apparatus includes the central processing unit (CPU) configured to perform actions according to the computer-executable instructions stored in a ROM or in a RAM. Optionally, data and programs required for a computer system are stored in RAM. Optionally, the CPU, the ROM, and the RAM are electrically connected to each other via bus. Optionally, an input/output interface is electrically connected to the bus.

In some embodiments, the apparatus includes one or more memory, and one or more processors, wherein the one or more memory and the one or more processors are connected with each other. In some embodiments, the one or more memory stores computer-executable instructions for controlling the one or more processors to input a low-resolution image and a plurality of high-resolution images into a feature extractor, the low-resolution image and the plurality of high-resolution images comprising images of a target object; obtain, by the feature extractor, feature maps of the low-resolution image and the plurality of high-resolution images; compare similarities between the feature maps of the low-resolution image and the plurality of high-resolution images; obtain selected feature maps of one or more selected high-resolution images of the plurality of high-resolution images most similar to the low-resolution image; input the selected feature maps into a generator to output a repair image; enhance the low-resolution image using a pre-processing image enhancing process to generate an enhanced image; and morph the repair image with the enhanced image.

In another aspect, the present disclosure provides a computer-program product including a non-transitory tangible computer-readable medium having computer-readable instructions thereon. In some embodiments, the computer-readable instructions being executable by a processor to cause the processor to perform inputting a low-resolution image and a plurality of high-resolution images into a feature extractor, the low-resolution image and the plurality of high-resolution images comprising images of a target object; obtaining, by the feature extractor, feature maps of the low-resolution image and the plurality of high-resolution images; comparing similarities between the feature maps of the low-resolution image and the plurality of high-resolution images; obtaining selected feature maps of one or more selected high-resolution images of the plurality of high-resolution images most similar to the low-resolution image; inputting the selected feature maps into a generator to output a repair image; enhancing the low-resolution image using a pre-processing image enhancing process to generate an enhanced image; and morphing the repair image with the enhanced image.

Various illustrative neural networks, layers, units, channels, blocks, and other operations described in connection with the configurations disclosed herein may be implemented as electronic hardware, computer software, or combinations of both. Such neural networks, layers, units, channels, blocks, and other operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method, comprising:
   inputting a low-resolution image and a plurality of high-resolution images into a feature extractor, the low-resolution image and the plurality of high-resolution images comprising images of a target object;
   obtaining, by the feature extractor, feature maps of the low-resolution image and the plurality of high-resolution images;
   comparing similarities between the feature maps of the low-resolution image and the plurality of high-resolution images;
   obtaining selected feature maps of one or more selected high-resolution images of the plurality of high-resolution images most similar to the low-resolution image;
   inputting the selected feature maps into a generator to output a repair image;
   enhancing the low-resolution image using a pre-processing image enhancing process to generate an enhanced image; and
   morphing the repair image with the enhanced image;
   wherein the computer-implemented method further comprises establishing a first database comprising the plurality of high-resolution images and a second database comprising a plurality of image parameters associated with the plurality of high-resolution images by:
   receiving a plurality of frames of image of a video;
   determining presence or absence of at least one target object in a respective frame of image of the plurality of frames of image, a number of target object in the respective frame of image, and a position of target object in the respective frame of image; and
   determining a resolution of a target image of the target object, when present, in the respective frame of image;
   wherein the computer-implemented method further comprises storing a sequential number of the respective frame of image, the presence or absence of at least one target object in the respective frame of image, the number of target object in the respective frame of image, the position of target object in the respective frame of image, and a target identifier in the second database.

2. The computer-implemented method of claim 1, wherein the low-resolution image is a facial image, and the target object is a face of a subject.

3. The computer-implemented method of claim 1, wherein the low-resolution image and the plurality of high-resolution images are facial images of frames of images in a video.

4. The computer-implemented method of claim 1, further comprising performing target recognition on the respective frame of image in which at least one target object is present; and
   storing one or more target images having a resolution greater than a threshold resolution and a target identifier associated with the target object in the first database, the plurality of high-resolution images comprising the one or more target images.

5. The computer-implemented method of claim 1, further comprising calculating similarity scores among the feature maps of the low-resolution image and the plurality of high-resolution images;
   wherein the one or more selected high-resolution images most similar to the low-resolution image are selected based on their differences in similarity scores with respect to the low-resolution image being below a threshold value.

6. The computer-implemented method of claim 5, wherein the feature extractor comprises:
   a first concatenation layer configured to concatenate the low-resolution image and the plurality of high-resolution images;
   a plurality of convolutional layers connected in series; and
   one or more fully connected layer;
   wherein the feature extractor is configured to output similarity scores of the low-resolution image and similarity scores of the plurality of high-resolution images from a last one of the one or more fully connected layer, and configured to output feature maps of the low-resolution image and the plurality of high-resolution images from an intermediate convolutional layer of the plurality of convolutional layers.

7. The computer-implemented method of claim 1, wherein inputting the selected feature maps into a generator to output a repair image comprises:
   permuting and combining the selected feature maps of the one or more selected high-resolution images to obtain a fused feature map;
   extracting features from the fused feature map; and
   reconfiguring the features from the fused feature map into the repair image.

8. The computer-implemented method of claim 7, wherein the generator comprises:
   a second concatenation layer configured to permute and combine the selected feature maps of the one or more selected high-resolution images to obtain a fused feature map;
   a resize layer connected to the second concatenation layer, and configured to resample the fused feature map into a fixed size;
   a plurality of encoding modules arranged in series;
   a plurality of decoding modules arranged in series; and
   at least one concatenation between a respective one of the plurality of encoding modules and a respective one of the plurality of decoding modules;
   wherein through the at least one concatenation between a respective one of the plurality of encoding modules and a respective one of the plurality of decoding modules, an output from the respective one of the plurality of encoding modules and an output from a decoding module at an immediate previous stage to the respective one of the plurality of decoding modules are concatenated as input to the respective one of the plurality of decoding modules.

9. The computer-implemented method of claim 8, wherein a difference between a number of the plurality of decoding modules and a number of the plurality of encoding modules is correlated to a number of times image resolution has increased from the low-resolution image to the repair image.

10. The computer-implemented method of claim 8, wherein a respective one of the plurality of encoding modules comprises a convolutional layer, a rectified linear unit connected to the convolutional layer, and a plurality of residual blocks arranged in series; and a respective one of the plurality of decoding modules comprises a plurality of residual blocks arranged in series, a deconvolutional layer or a pixel shuffle layer, a rectified linear unit connected to the deconvolutional layer or the pixel shuffle layer, and a convolutional layer connected to the rectified linear unit.

11. The computer-implemented method of claim 1, wherein morphing the repair image with the enhanced image comprises:

constructing a mask having a target area corresponding to a respective target image and a background area outside the target area; and performing a filtering process on the mask to generate a filtered mask having a target portion corresponding to the respective target image and a background portion outside the target portion.

12. The computer-implemented method of claim 11, wherein morphing the repair image with the enhanced image comprises generating a morphed image according to GMtarget*Itarget+(1−GMtarget)*Isr;

wherein GMtarget stands for the target portion of the filtered mask;

Itarget stands for the repair image; and

Isr stands for the enhanced image generated by enhancing the low-resolution image using a pre-processing image enhancing process.

13. The computer-implemented method of claim 1, further comprising using a feedback loop to train the generator based on at least one of a generator loss function and a discriminator loss function;

wherein the generator is configured to output the repair image to a loss function calculator, and to a discriminator configured to determine whether the repair image is real or fake;

the loss function calculator is configured to compute a generator loss function and a discriminator loss function based on the repair image;

the feedback loop is configured to mutually train the generator and the discriminator, based on the generator loss function and the discriminator loss function; and the feedback loop comprises a first feedback loop for optimizing parameters of the generator and a second feedback loop for optimizing parameters of the discriminator.

14. The computer-implemented method of claim 13, wherein the generator loss function is configured to calculate one or more of a content loss, a first generative adversarial network (GAN) loss, a weighted L1 loss, and an eye area loss;

wherein the content loss is expressed as:

$$L_{content} = \frac{1}{2C1} \sum_{ij} (F_{ij}^l - P_{ij}^l)^2,$$

wherein $L_{content}$ stands for the content loss, C1 is a constant for standardizing results; $P^l$ stands for a feature map output from a l-th layer of the loss function calculator with the low-resolution image as an input; and $F^l$ stands for a feature map output from the l-th layer of the loss function calculator with the repair image as an input;

wherein the first GAN loss is expressed as $L_G = -E_{x \sim Pdata(x)}[\log D(x)] - E_{z \sim Pz(z)}[1 - \log D(G(z))]$;

wherein LG stands for the first GAN loss; z stands for an input of the generator; Pz stands for an input set of the generator; x stands for a true sample, Pdata stands for a set of true samples; D(x) stands for a result obtained after the true sample is input to the discriminator; G(z) stands for an output result of the generator; $E_{x \sim Pdata(x)}$ stands for that x is sampled from the true sample set, and subsequent operations are performed for any x; and $E_{z \sim pz(z)}$ stands for that z is sampled from the input set Pz, and subsequent operations are performed for any z;

wherein the weighted L1 loss is expressed as L1=w1*(abs($R_i - R_g$))+w2*(abs($G_i - G_g$))+w3*(abs($B_i - B_g$));

wherein $R_i$, $G_i$, and $B_i$ stands for R, G, and B channels of the repair image from the generator, respectively, and $R_g$, $G_g$, and $B_g$ stands for R, G, and B channels of a reference image; w1, w2, and w3 stands for weights, respectively;

wherein the eye area loss is expressed as $L_{eye} = L_{content}(O_{eye}, G_{eye}) + L_{content}(O_{eye}[:,0: 0.5w], O_{eye}[:,0.5w: w]) + L_{content}(G_{eye}[:,0: 0.5w], G_{eye}[:,0.5w: w])$;

wherein $O_{eye}$ stands for a total eye area of the repair image; $G_{eye}$ stands for a total eye area of the reference image; and $L_{content}(O_{eye}, G_{eye})$ stands for a content loss between the reference image and the repair image; $O_{eye}[:,0:0.5w]$ stands for a left half of the total eye area of the repair image and $O_{eye}[:, 0.5w: w]$ stands for a right half of the total eye area of the repair image, provided a value of a width of the total eye area of the repair image increases from 0 on the left to w on the right; $G_{eye}[:, 0:0.5w]$ stands for a left half of the total eye area of the reference image and $G_{eye}[:, 0.5w: w])$ stands for a right half of the total eye area of the reference image, provided a value of a width of the total eye area of the reference image increases from 0 on the left to w on the right; $L_{content}(O_{eye}[: 0:0.5w], O_{eye}[:, 0.5w: w])$ stands for a content loss between the left half and the right half of the total eye area of the repair image; and $L_{content}(G_{eye}[:,0:0.5w], G_{eye}[:, 0.5w: w])$ stands for a content loss between the left half and the right half of the total eye area of the reference image.

15. The computer-implemented method of claim 13, wherein the discriminator loss function is configured to calculate a second adversarial network (GAN) loss;

wherein the second GAN loss is expressed as $L_D = -E_{x \sim Pdata(x)}[\log D(x)] - E_{z \sim Pz(z)}[1 - \log D(G(z))]$;

wherein $L_D$ stands for the second GAN loss; z stands for an input of the generator; Pz stands for an input set of the generator; x stands for a true sample, Pdata stands for a set of true samples; D(x) stands for a result obtained after the true sample is input to the discriminator; G(z) stands for an output result of the generator; $E_{x \sim Pdata(x)}$ stands for that x is sampled from the true sample set, and subsequent operations are performed for any x; and $E_{z \sim Pz(z)}$ stands for that z is sampled from the input set Pz, and subsequent operations are performed for any z.

16. The computer-implemented method of claim 1, further comprising pre-training the generator using a feedback loop based on at least one of a generator loss function and a discriminator loss function;

wherein the generator is pre-trained using a plurality of pairs of high-resolution reference images and low-resolution reference images;

a plurality of low-resolution reference images in the plurality of pairs are generated using the plurality of high-resolution reference images in the plurality of pairs by:

down-sampling the plurality of high-resolution reference images to generate a plurality of down-sampled reference images;

performing Gaussian blurring on the plurality of down-sampled reference images to generate a plurality of down-sampled and blurred reference images; and applying compression noise on the plurality of down-sampled and blurred reference images, thereby generating the plurality of low-resolution reference images.

17. An apparatus, comprising:
one or more memory; and
one or more processors;
wherein the one or more memory and the one or more processors are connected with each other; and
the one or more memory stores computer-executable instructions for controlling the one or more processors to:

input a low-resolution image and a plurality of high-resolution images into a feature extractor, the low-resolution image and the plurality of high-resolution images comprising images of a target object;

obtain, by the feature extractor, feature maps of the low-resolution image and the plurality of high-resolution images;

compare similarities between the feature maps of the low-resolution image and the plurality of high-resolution images;

obtain selected feature maps of one or more selected high-resolution images of the plurality of high-resolution images most similar to the low-resolution image;

input the selected feature maps into a generator to output a repair image;

enhance the low-resolution image using a pre-processing image enhancing process to generate an enhanced image; and morph the repair image with the enhanced image;

wherein the one or more memory further stores computer-executable instructions for controlling the one or more processors to establish a first database comprising the plurality of high-resolution images and a second database comprising a plurality of image parameters associated with the plurality of high-resolution images by:

receiving a plurality of frames of image of a video;

determining presence or absence of at least one target object in a respective frame of image of the plurality of frames of image, a number of target object in the respective frame of image, and a position of target object in the respective frame of image; and determining a resolution of a target image of the target object, when present, in the respective frame of image;

wherein the one or more memory further stores computer-executable instructions for controlling the one or more processors to store a sequential number of the respective frame of image, the presence or absence of at least one target object in the respective frame of image, the number of target object in the respective frame of image, the position of target object in the respective frame of image, and a target identifier in the second database.

18. A computer-program product comprising a non-transitory tangible computer-readable medium having computer-readable instructions thereon, the computer-readable instructions being executable by a processor to cause the processor to perform:

inputting a low-resolution image and a plurality of high-resolution images into a feature extractor, the low-resolution image and the plurality of high-resolution images comprising images of a target object;

obtaining, by the feature extractor, feature maps of the low-resolution image and the plurality of high-resolution images;

comparing similarities between the feature maps of the low-resolution image and the plurality of high-resolution images;

obtaining selected feature maps of one or more selected high-resolution images of the plurality of high-resolution images most similar to the low-resolution image;

inputting the selected feature maps into a generator to output a repair image;

enhancing the low-resolution image using a pre-processing image enhancing process to generate an enhanced image; and morphing the repair image with the enhanced image;

wherein the computer-readable instructions are executable by a processor to further cause the processor to perform establishing a first database comprising the plurality of high-resolution images and a second database comprising a plurality of image parameters associated with the plurality of high-resolution images by:

receiving a plurality of frames of image of a video;

determining presence or absence of at least one target object in a respective frame of image of the plurality of frames of image, a number of target object in the respective frame of image, and a position of target object in the respective frame of image; and determining a resolution of a target image of the target object, when present, in the respective frame of image;

wherein the computer-readable instructions are executable by a processor to further cause the processor to perform storing a sequential number of the respective frame of image, the presence or absence of at least one target object in the respective frame of image, the number of target object in the respective frame of image, the position of target object in the respective frame of image, and a target identifier in the second database.

* * * * *